US008510241B2

(12) United States Patent
Seshan

(10) Patent No.: US 8,510,241 B2
(45) Date of Patent: Aug. 13, 2013

(54) APPROACH FOR SOLVING GLOBAL OPTIMIZATION PROBLEM

(75) Inventor: Ananth Seshan, Tamil Nadu (IN)

(73) Assignee: Empire Technology Development LLC, Wilmington, DE (US)

( * ) Notice: Subject to any disclaimer, the term of this patent is extended or adjusted under 35 U.S.C. 154(b) by 998 days.

(21) Appl. No.: 12/541,171

(22) Filed: Aug. 14, 2009

(65) Prior Publication Data

US 2010/0057652 A1 Mar. 4, 2010

(30) Foreign Application Priority Data

Aug. 29, 2008 (IN) .......................... 2121/CHE/2008

(51) Int. Cl.
*G06F 15/18* (2006.01)
*G06F 7/60* (2006.01)

(52) U.S. Cl.
USPC ............................................... 706/19; 703/2

(58) Field of Classification Search
None
See application file for complete search history.

(56) References Cited

U.S. PATENT DOCUMENTS

| | | | |
|---|---|---|---|
| 7,363,126 B1 * | 4/2008 | Zhong et al. | 701/25 |
| 2006/0095484 A1 * | 5/2006 | Erramilli et al. | 708/200 |
| 2007/0129930 A1 * | 6/2007 | Peralta et al. | 703/22 |

OTHER PUBLICATIONS

Ismagilov, Zinfer R., Shikina, Nadezhda V., Kruchinin, Vladimir N., Rudina, Nina A., Ushakov, Vladimir A., Vasenin, Nikolai T. and Veringa, Hubert J., "Development of Methods of Growing Carbon Nanofibers on Silica Glass Fiber Supports", CarboCat-1 International Symposium on Carbon for Catalysis No. 1, Catalysis Today, 2005, vol. 102-103, pp. 85-93.

Bower, Chris, Zhu, Wei, Jin, Sungho and Zhou, Otto, "Plasma-Induced Alignment of Carbon Nanotubes", Applied Physics Letters, 2000, vol. 77, Issue 6, id. 830. doi: 10.1063/1.1306658.

* cited by examiner

*Primary Examiner* — Alan Chen
(74) *Attorney, Agent, or Firm* — Ren-Sheng International

(57) ABSTRACT

An approach for solving a global optimization problem is described. Specifically, one embodiment of the disclosure sets forth a method, which includes the steps of receiving a quantitative initial solution, generating a quantitative feasible solution, mapping the quantitative feasible solution to a qualitative feasible solution, determining whether to accept the qualitative feasible solution based on a first predetermined rule, wherein the qualitative feasible solution that is accepted is reverse mapped to the quantitative feasible solution, and transmitting a result of the determining step.

17 Claims, 5 Drawing Sheets

500

500 A computer program product 504 at least one of one or more instructions for receiving a quantitative initial solution;

one or more instructions for generating a quantitative feasible solution;

one or more instructions for mapping the quantitative feasible solution to qualitative feasible solution;

one or more instructions for determining whether to accept the qualitative feasible solution based on a first predetermined rule, wherein the qualitative feasible solution that is accepted is reverse mapped to the quantitative feasible solution; or one or more instructions for transmitting a result of the determining instruction or determining instructions 506 a computer readable medium 508 a recordable medium

FIG. 5

APPROACH FOR SOLVING GLOBAL OPTIMIZATION PROBLEM

CROSS-REFERENCE TO RELATED APPLICATIONS

This application claims priority to Indian Patent Application 2121/CHE/2008, filed on Aug. 29, 2008.

BACKGROUND

Description of the Related Art

Unless otherwise indicated herein, the approaches described in this section are not prior art to the claims in this application and are not admitted to be prior art by inclusion in this section.

A global optimization problem is usually solved with a numerical method, such as simulated annealing, tabu search, genetic algorithm and so on. In various numerical methods, simulated annealing is a generic probabilistic meta-algorithm for a global optimization problem, namely locating a good approximation to the global optimum of a given function in a large search space. The name and inspiration come from annealing in metallurgy. Each step of the simulated annealing algorithm replaces the current solution by a random "nearby" solution, chosen with a probability that depends on the difference between the corresponding function values and on a global parameter T, which is called the temperature and is gradually decreased during the process. The dependency is such that the current solution changes almost randomly when T is large, but increasingly become stable as T goes to zero. This can prevent the method from becoming stuck at a local minimum.

The simulated annealing method can be used for solving the traveling salesman problem, the vehicle routing problem, the vehicle routing problem within time windows, and so on. For example, a vehicle routing problem within time windows is a combinatorial optimization and nonlinear programming problem seeking to service a number of customers with a fleet of vehicles within a specific time window for each customer. Other constraints in the vehicle routing problem within time windows include, but not limited to, distance between each customer, earliest time to begin a service, latest time to begin a service, vehicle capacity, vehicle type, traffic stops and turns. One goal in solving the vehicle routing problem within time windows is to minimize the cost of distributing the goods. In some circumstances, the problem may include more constraints other than those set forth above to take additional factors into consideration. Having additional constraints may significantly increase the complexity of the problem and also the computational cost.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 5 is a block diagram illustrating a computer program product of an approach for solving a global optimization problem in one embodiment of the disclosure.

DETAILED DESCRIPTION

Figure 1:
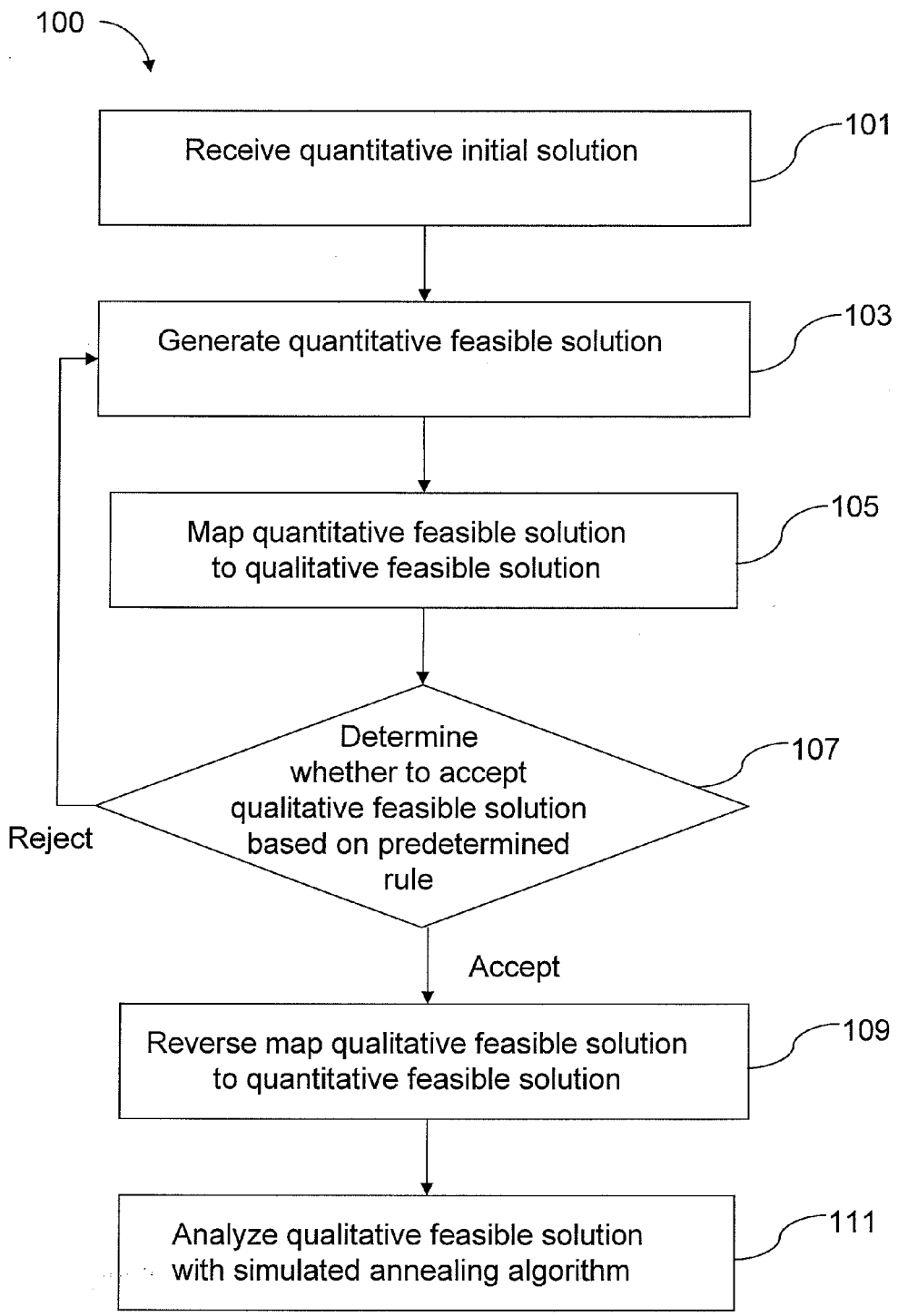
FIG. 1 is a flowchart illustrating the method steps for solving a global optimization problem performed by a computer program, according to one embodiment of the disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to solving a global optimization problem. Embodiments of the disclosure provide methods, apparatus, computer programs and systems that include an improved simulated annealing algorithm capable of reducing the computation time. As a result, a dynamic, instantaneous, and real time solution can be obtained.

FIG. 1 is a flowchart of a method 100 for solving a global optimization problem performed by a computer program, according to one embodiment of the disclosure. The goal for solving the global optimization problem is to maximize or minimize an object function in such a problem. An object function may be the total traveling cost of a route in a vehicle routing problem. In step 101, the computer program receives an initial solution. The initial solution is quantitative and may be the current solution of the global optimization problem. In one implementation, the computer program is equipped with a computation engine configured to operate the simulated annealing algorithm. In one implementation, the computer program further receives an initial temperature and parameter values in step 101.

In step 103, the computer program randomly generates a feasible solution based on a configurable algorithm. The feasible solution is quantitative. In addition, the algorithm may be configured based on some known neighborhood transition schemes.

In step 105, the computer program maps the quantitative feasible solution obtained in step 103 to a qualitative solution. The constraints in a quantitative feasible solution are consolidated to a new numerical resultant and the new numerical resultant is mapped to a qualitative solution. The relationship between the new numerical resultant and the qualitative solution is configurable. For example, in one implementation, in a vehicle routing problem, one feasible solution includes three constraints, an 80 kilometers total traveling distance, a 90 hours total traveling time, and a $150 gas expense. The three constraints may be consolidated into a new numerical resultant for the mapping. One way is to calculate a root mean square of the three constraints. Here, the new numerical resultant is the root mean square of 80, 90, and 150. In one implementation, one can set three tiers for the qualitative solution, such as "economical," "moderately economical," and "costly." One can further set ranges for the three tiers. For example, the new numerical resultant below 100 is considered as "economical," the new numerical resultant between 101 to 300 is considered as "moderate economical," and the new numerical resultant above 301 is considered as "costly." In this example, the quantitative feasible solution is mapped to a "moderately economical" qualitative solution. The computer program also stores the quantitative feasible solution for future processing.

The approach for consolidating the constraints is not limited to a specific approach. Those skilled in the art should recognize that there are other suitable approaches to consolidate the multiple constraints into a new numerical resultant, such as, without limitation, the generalized mean, the arithmetic mean, the geometric mean, the harmonic mean, and the weighted mean.

There may be two types of constraints. An independent constraint refers to a constraint that is not associated with another constraint. A dependent constraint, on the other hand, refers to a constraint that is associated with another constraint. In a vehicle routing problem within time windows, for example, the capacity of each vehicle is an independent constraint as it is not associated with other constraints. The traffic stops and turns are dependent constraints, because they may be associated with the distances among different customers, the current traffic situations, or the combination of both. The types of constraints may influence the approach for consolidating the constraints.

In one implementation, each constraint may be further weighted according to the current scenario of the global optimization problem. For example, in a vehicle routing problem within time windows, one can give more weights to the constraints including, but not limited to, the total traveling distance and the traffic stops to minimize the total delivery time.

In step 107, the computer program determines whether to accept or reject a qualitative feasible solution based on a predetermined rule. The predetermined rule is configured to accept a qualitative feasible solution. To illustrate, in one implementation, the predetermined rule is that only the "economic" qualitative solution is accepted, and the "moderately economic" qualitative solution and the "costly" qualitative solution are rejected. After the qualitative feasible solution is rejected, then the method 100 returns to step 103.

In step 109, the computer program reverse maps the qualitative feasible solution that is accepted in step 107 to the quantitative feasible solution stored in step 105. Then, in step 111, the computer program analyzes the quantitative feasible solution with the simulated annealing algorithm. The simulated annealing algorithm includes, but not limited to, comparing the difference between the object functions of the quantitative feasible solution and of the initial solution, determining whether to accept the quantitative feasible solution as a new initial solution, determining whether the temperature lowering criteria are met, and determining whether the stopping criteria are met. When the quantitative feasible solution is accepted as a new initial solution, the method 100 returns to step 101, and the quantitative feasible solution is set as the new initial solution. When the quantitative feasible solution is not accepted as a new initial solution, however, the method 100 returns to step 103.

Figure 2:
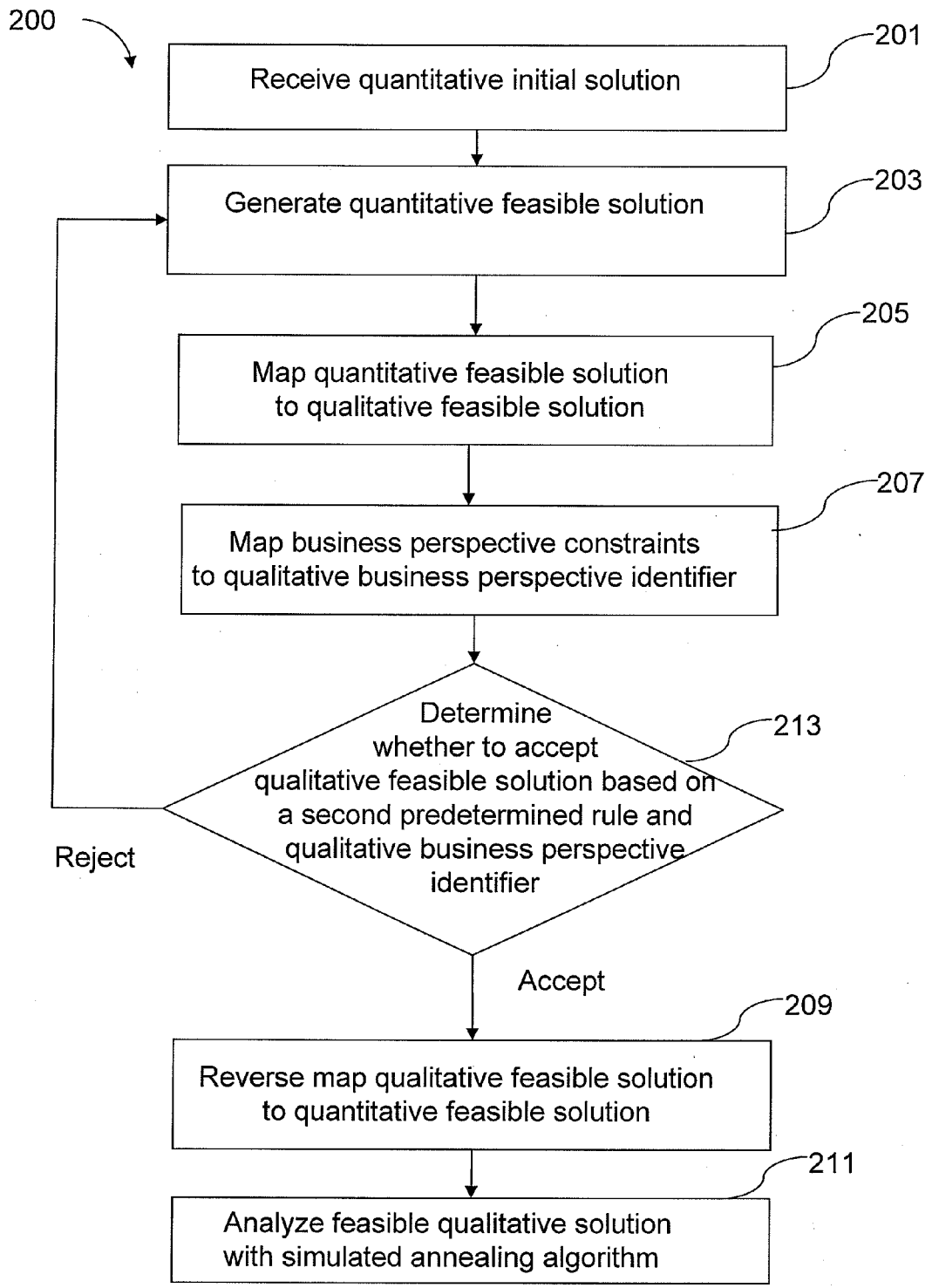
FIG. 2 is a flowchart illustrating the method steps for solving a global optimization problem performed by a computer program, according to one embodiment of the disclosure.

FIG. 2 is a flowchart of a method 200 for solving a global optimization problem performed by a computer program, according to one embodiment of the disclosure. The steps 201, 203, 205 are either the same or similar to the steps 101, 103, 105 of FIG. 1, respectively. Therefore, similar to step 105, the computer program stores the quantitative feasible solution for future processing in step 205.

In step 207, business perspective constraints of the qualitative feasible solution are consolidated and mapped to a qualitative business perspective identifier. Each quantitative feasible solution stored in step 205 also includes business perspective constraints. In step 207, the computer program accesses these business perspective constraints and consolidates these business perspective constraints into a business perspective numeral. In one implementation, the computer program further accesses a database which includes business perspective information and takes the business perspective information into consideration when consolidating the business perspective constraints. In addition, the business perspective numeral is given a qualitative business perspective identifier. One can set tiers to process the business perspective numeral and also the ranges of these tiers in a similar manner as set forth above.

In step 213, the computer program determines whether to accept the qualitative feasible solution obtained in step 205 based on a second predetermined rule, the qualitative feasible solution obtained in step 205, and the qualitative business perspective identifier obtained in step 207. In one implementation, the second predetermined rule is based on business considerations, for example, from the perspective of a shipping company and the object function of the global optimization problem, such as the transportation cost of a route in the vehicle routing problem within time windows. The business consideration associated with the second predetermined rule may include, but is not limited to, transaction history with a specific customer, potential business from a specific customer, satisfaction of a specific customer, and so on. The second predetermined rule is configurable to accept the qualitative feasible solution with the appropriate qualitative business perspective identifier. Therefore, in step 213, for a vehicle routing problem within time windows, when determining whether to accept the qualitative solution, the computer program considers not only the distance between each customer, earliest time to begin a service, latest time to begin a service, vehicle capacity, vehicle type, traffic stops and turns, but also from the business perspective of the shipping company. The accepted qualitative feasible solution is then further processed in steps 209 and 211. After a qualitative feasible solution is rejected in step 213, then the method 200 returns to step 203.

Similar to steps 109 and 111, in step 209, the computer program reverse maps the qualitative feasible solution accepted in step 213 to the quantitative feasible solution stored in the step 205. Then, in step 211, the computer program analyzes the quantitative feasible solution with the simulated annealing algorithm.

Figure 3:
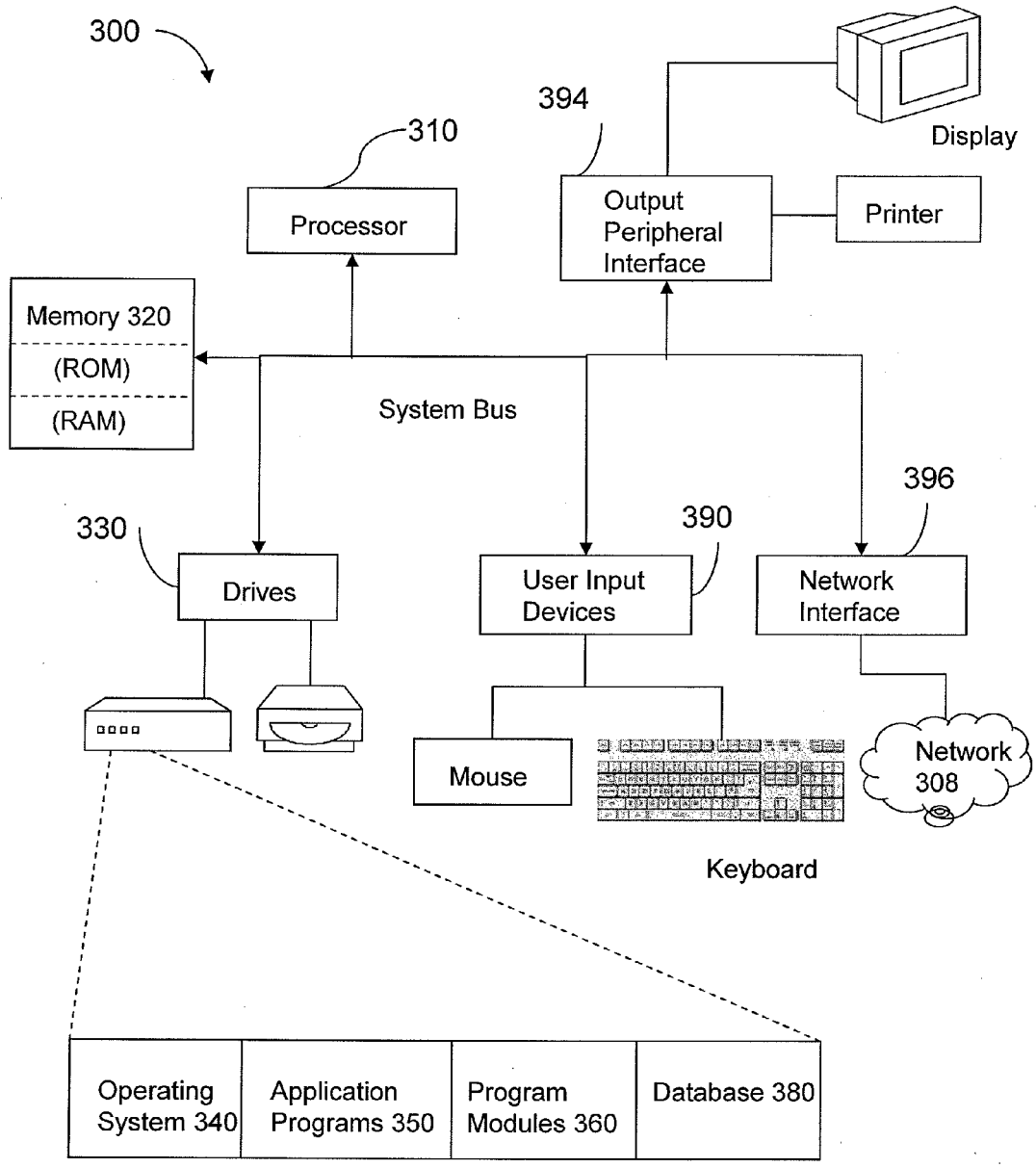
FIG. 3 depicts an exemplary computing system for implementing embodiments of the disclosure.

With reference to FIG. 3, depicted is an exemplary computing system for implementing embodiments of the disclosure. FIG. 3 includes a computer 300, including a processor 310, memory 320 and one or more drives 330. The drives 330 and their associated computer storage media, provide storage of computer readable instructions, data structures, program modules and other data for the computer 300. Drives 330 can include an operating system 340, application programs 350, program modules 360, and database 380. Computer 300 further includes user input devices 390 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 310 through a user input interface that is coupled to a system bus, but may be connected by other interface and bus structures, such as a parallel port, game port or a universal serial bus (USB). Computers such as computer 300 may also include other peripheral output devices such as a display device or a printer, which may be connected through an output peripheral interface 394 or the like.

Computer 300 may operate in a networked environment using logical connections to one or more computers, such as a remote computer connected to network interface 396 The remote computer may be a personal computer, a server, a router, a network PC, a peer device or other common network node, and can include many or all of the elements described above relative to computer 300. Networking environments are commonplace in offices, enterprise-wide area networks (WAN), local area networks (LAN), intranets and the Internet. For example, in the subject matter of the present application, computer 300 may include the source machine from which data is being migrated, and the remote computer may include the destination machine or vice versa. Note however, that source and destination machines need not be connected by a network 308 or any other means, but instead, data may be migrated via any media capable of being written by the source platform and read by the destination platform or platforms. When used in a LAN or WLAN networking environment, computer 300 is connected to the LAN through a network interface 396 or an adapter. When used in a WAN networking environment, computer 300 typically includes a modem or other means for establishing communications over the WAN, such as the Internet or network 308. In light of the present disclosure, it will be appreciated that other means of establishing a communications link between the computers may be used.

According to one embodiment, computer 300 is connected in a networking environment such that the processor 310 and/or program modules 360 can perform a computation for a global optimization problem in accordance with embodiments and implementations herein.

The computer 300 receives information about the initial quantitative solution and other necessary parameters and settings of an algorithm through the user input device 390. In one implementation, the processor 310 causes the received information being saved into the memory 320. In addition, the processor 310 causes the program module 360 executed in the memory 320. The program module 360 performs steps of including, but not limited to, generating a quantitative feasible solution, mapping the quantitative feasible solution to a qualitative feasible solution, determining whether to accept the qualitative feasible solution based on a first predetermined rule, wherein the qualitative feasible solution that is accepted is reverse mapped to the quantitative feasible solution, and analyzing the accepted qualitative feasible solution with an appropriate numerical method, such as simulated annealing. The processor 310 also causes the result obtained from the operation of the program module 360 being output to an output device through the output peripheral interface 394.

In one implementation, the processor 310 causes the business information stored in the database 380 loaded to the memory 320 while the program module 360 is executed. The business information may include, but not limited to, transaction history with a specific customer, potential business from a specific customer, satisfaction of a specific customer and so on. The business information may also be collected from the network 308 through the network interface 396.

Figure 4:
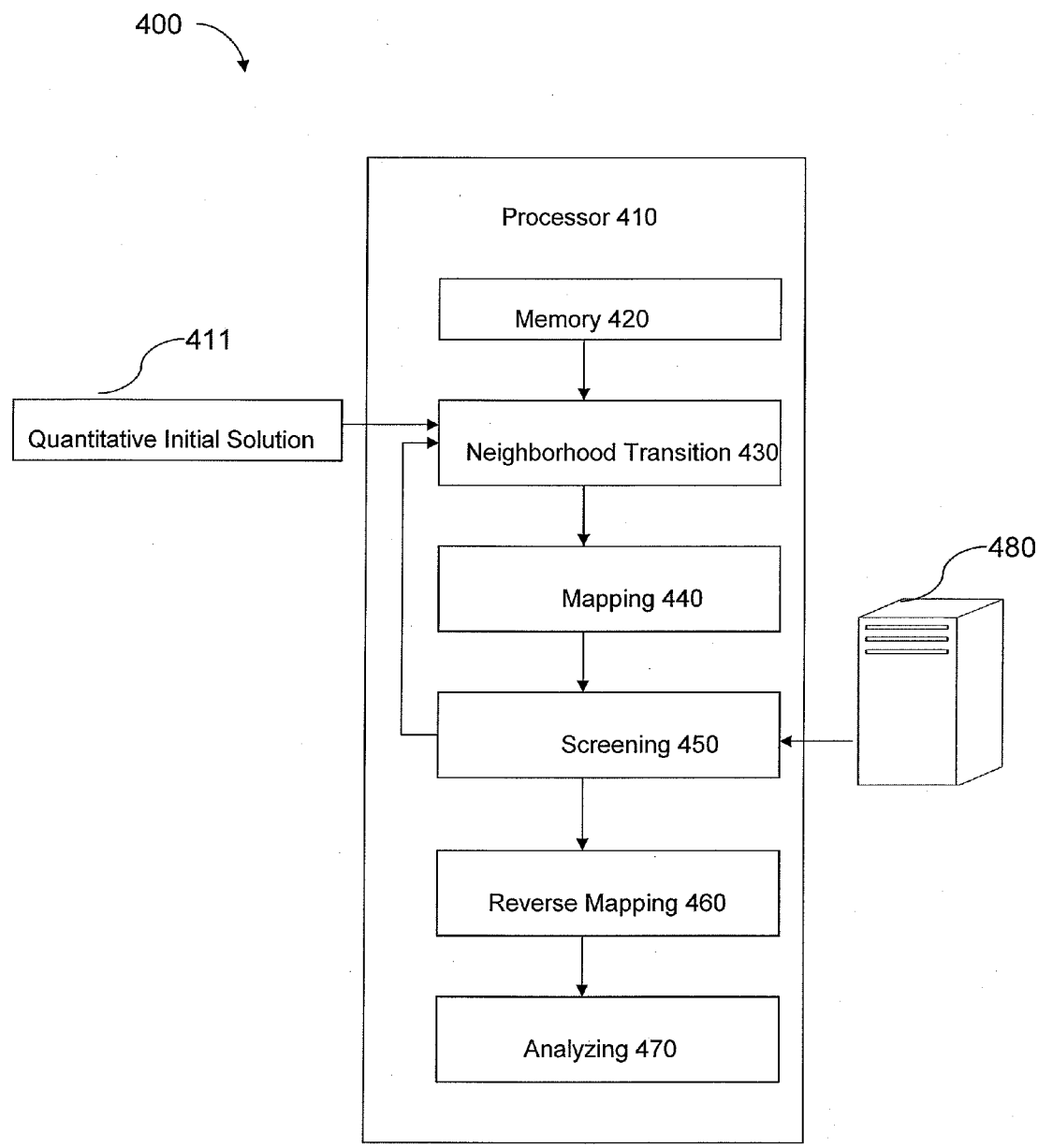
FIG. 4 is a block diagram illustrating the software modules and the database of a computer program executed by a processor in one embodiment of the disclosure.

FIG. 4 is a block diagram illustrating the software modules and the databases of the computer program executed by a processor in one embodiment of the disclosure. The computer program includes a neighborhood transition module 430, a mapping module 440, a screening module 450, a reverse mapping module 460, and a presentation module 470. In one implementation, the instructions for each of the modules described above are stored in memory 420 and are executed by processor 410. Neighborhood transition module 430 receives a quantitative initial solution 411 and randomly generates a quantitative feasible solution. Mapping module 440 receives the quantitative feasible solution and maps the quantitative feasible solution to a qualitative feasible solution. Mapping module 440 also stores the quantitative feasible solution to memory 420 for further processing.

Screening module 450 receives the qualitative feasible solution and determines whether to accept the qualitative feasible solution. The determination is based on a predetermined rule. In addition, the determination may be also based on the information stored in a database 480. Only appropriate qualitative feasible solution is accepted, and screening module 450 sends the accepted qualitative feasible solution to reverse mapping module 460. The inappropriate qualitative feasible solution is rejected. Screening module 450 then notifies neighborhood transition module 430 to generate a new quantitative feasible solution.

Reverse mapping module 460 receives accepted qualitative feasible solution, accesses the corresponding quantitative feasible solution stored in memory 420, and reverse maps the qualitative feasible solution to the corresponding quantitative feasible solution. The analyzing module 470 receives the quantitative feasible solution and analyzes quantitative feasible solution.

FIG. 5 is a block diagram illustrating a computer program product 500 of an approach for solving a global optimization problem in one embodiment of the disclosure. Computer program product 500 includes instructions 504 of the approach. Alternatively, computer program product 500 is recorded in computer readable medium 506 or any other recordable medium 508.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for solving a global optimization problem, comprising:
   receiving a quantitative initial solution;
   generating a quantitative feasible solution;
   consolidating a plurality of constraints of the quantitative feasible solution to a numerical resultant;
   converting the numerical resultant to a qualitative feasible solution; and
   determining whether to accept the qualitative feasible solution based on a first predetermined rule, wherein the qualitative feasible solution that is accepted is reverse mapped to the quantitative feasible solution.

2. The method of claim 1, further comprising applying a weight to a constraint.

3. The method of claim 2, wherein the first predetermined rule is associated with the weight.

4. The method of claim 1, wherein the qualitative feasible solution rejected in the determining step is further processed based on a second predetermined rule.

5. The method of claim 4, wherein the second predetermined rule is associated with a business consideration.

6. The method of claim 4, wherein the qualitative feasible solution is associated with a plurality of business perspective constraints.

7. The method of claim 6, further comprising consolidating the plurality of business perspective constraints to a business perspective numeral and converting the business perspective numeral to a business perspective qualitative identifier.

8. The method of claim 4, wherein the qualitative feasible solution is accepted to be further analyzed if the business perspective qualitative identifier complies with the second predetermined rule.

9. The method of claim 5, wherein the business consideration includes business related information associated with a specific customer.

10. The method of claim 1, wherein the quantitative feasible solution that is reverse mapped is further analyzed by a simulated annealing method.

11. The method of claim 1, further comprising generating a new quantitative feasible solution when the qualitative feasible solution is rejected in the determining step.

12. The method of claim 7, further comprising generating a new quantitative feasible solution if the business perspective qualitative identifier fails to comply with the second predetermined rule.

13. The method of claim 1, wherein the global optimization problem is a vehicle routing problem within a time window.

14. A computing device configured to solve a global optimization problem, comprising:
   a memory; and
   a processing unit arranged to interface with the memory, wherein the processing unit is configured to:
      receive a quantitative initial solution;
      generate a quantitative feasible solution;
      consolidate a plurality of constraints of the quantitative feasible solution to a numerical resultant;
      convert the numerical resultant to a qualitative feasible solution; and
      determine whether to accept the qualitative feasible solution based on a first predetermined rule, wherein the qualitative feasible solution that is accepted is reverse mapped to the quantitative feasible solution.

15. The computing device of claim 14, wherein the processing unit is further configured to apply a weight to a constraint.

16. The computing device of claim 14, wherein the qualitative feasible solution not accepted by the computing device is further processed based on a second predetermined rule associated with a business consideration.

17. A non-transitory computer-readable medium containing a sequence of instructions for solving a global optimization problem, which when executed by a computing device, causes the computing device to:
   receive a quantitative initial solution;
   generate a quantitative feasible solution;
   consolidate a plurality of constraints of the quantitative feasible solution to a numerical resultant;
   convert the numerical resultant to a qualitative feasible solution; and
   determine whether to accept the qualitative feasible solution based on a first predetermined rule, wherein the qualitative feasible solution that is accepted is reverse mapped to the quantitative feasible solution.

* * * * *